(12) United States Patent
Kanakubo et al.

(10) Patent No.: US 7,141,508 B2
(45) Date of Patent: Nov. 28, 2006

(54) MAGNETORESISTIVE EFFECT THIN-FILM MAGNETIC HEAD AND MANUFACTURING METHOD OF MAGNETORESISTIVE EFFECT THIN-FILM MAGNETIC HEAD

(75) Inventors: Katsuya Kanakubo, Tokyo (JP); Yoshimitsu Wada, Tokyo (JP); Kazuhiro Hattori, Tokyo (JP)

(73) Assignee: TDK Corporation, Tokyo (JP)

( * ) Notice: Subject to any disclaimer, the term of this patent is extended or adjusted under 35 U.S.C. 154(b) by 295 days.

(21) Appl. No.: 10/212,744

(22) Filed: Aug. 7, 2002

(65) Prior Publication Data

US 2003/0146186 A1 Aug. 7, 2003

(30) Foreign Application Priority Data

Aug. 8, 2001 (JP) .............................. 2001-240659

(51) Int. Cl.
*H01L 21/302* (2006.01)
(52) U.S. Cl. ...................... 438/720; 438/706; 438/714; 216/72; 216/77
(58) Field of Classification Search ............... 438/706, 438/710, 712, 720, 714; 216/58, 67, 72, 216/77
See application file for complete search history.

(56) References Cited

U.S. PATENT DOCUMENTS

| | | | | | |
|---|---|---|---|---|---|
| 3,975,252 | A | * | 8/1976 | Fraser et al. ............ | 204/192.15 |
| 4,135,998 | A | * | 1/1979 | Gniewek et al. ........ | 204/192.35 |
| 4,268,374 | A | * | 5/1981 | Lepselter ................ | 204/298.31 |
| 5,173,449 | A | * | 12/1992 | Lorenzen et al. ........... | 438/653 |
| 5,761,010 | A | * | 6/1998 | Mimura .................. | 360/327.32 |
| 6,407,004 | B1 | * | 6/2002 | Kimura et al. .............. | 438/720 |

FOREIGN PATENT DOCUMENTS

| | | |
|---|---|---|
| JP | 07-045586 | 2/1995 |
| JP | 11-53716 | 2/1999 |
| JP | 2000-099926 | 4/2000 |
| JP | 2000-99926 | 4/2000 |
| JP | 2001-028442 | 1/2001 |
| WO | WO 99/46812 | 9/1999 |
| WO | WO 00/24048 | 4/2000 |

* cited by examiner

*Primary Examiner*—Lan Vinh
(74) *Attorney, Agent, or Firm*—Oblon, Spivak, McClelland, Maier & Neustadt, P.C.

(57) ABSTRACT

A manufacturing method of an MR thin-film magnetic head with an MR film and lead conductors overlapping each other, includes a step of depositing a conductor layer on at least the magnetoresistive effect film, a step of forming a cap layer patterned on the deposited conductor layer, and a step of dry-etching the deposited conductor layer through a mask of the patterned cap layer using an Ar gas and an $O_2$ gas, an $O_2$ gas or a $N_2$ gas so as to pattern the deposited conductor film to form the lead conductors.

29 Claims, 16 Drawing Sheets

MAGNETORESISTIVE EFFECT THIN-FILM MAGNETIC HEAD AND MANUFACTURING METHOD OF MAGNETORESISTIVE EFFECT THIN-FILM MAGNETIC HEAD

FIELD OF THE INVENTION

The present invention relates to a magnetoresistive effect (MR) thin-film magnetic head and to a manufacturing method of an MR thin-film magnetic head.

Description of the Related Art

In order to satisfy recent requirements for increasing in recoding density and downsizing of a magnetic disk drive apparatus, an MR thin-film magnetic head capable of providing a high reproduction output voltage without dependence on a relative speed between the magnetic head and the rotating magnetic disk becomes widespread. A composite thin-film magnetic head provided with a read MR sensor utilizing its resistance change depending upon the received magnetic flux change and a write inductive electromagnetic transducer integrally laminated with each other is used as a typical MR thin-film magnetic head.

As for the MR sensor, not only an anisotropic magnetoresistive effect (AMR) sensor, but also a giant magnetoresistive effect (GMR) sensor such as a spin-valve magnetoresistive effect (SVMR) sensor are now widely used.

The SVMR sensor has a SVMR multi-layered film basically consisting of a ferromagnetic layer (free layer) a magnetization direction of which changes depending upon a magnetic field from a magnetic recording medium, a ferromagnetic layer (pinned layer) a magnetization direction of which is fixed, a nonmagnetic conductive layer inserted between the free layer and the pinned layer, and an antiferromagnetic layer or a permanent-magnet layer for fixing the magnetization direction of the pinned layer.

In order to increase the output voltage from the SVMR sensor and the AMR sensor, it is effective to control a magnetic domain in the free layer of the SVMR multi-layered film and an MR film in the AMR sensor into a single domain. A patterned exchange control method and a hard bias control method are typical single-domain control methods. According to the patterned exchange control method, domain control films are formed on side end regions of the SVMR multi-layered film or the MR film to control these side end regions into a single domain and thus to induce a magnetic sensitive region in the center of the SVMR multi-layered film or the MR film into a single domain. According to the hard bias control method, side end sections of the SVMR multi-layered film or the MR film are removed by an ion milling using a lift-off pattern as a mask to remain only a magnetic sensitive region in the center, and permanent magnet layers are disposed at side ends of the magnetic sensitive region so as to induce the magnetic sensitive region into a single domain by a magnetic field from the permanent magnet layers.

Recently, in order to obtain more sensitive SVMR sensor or AMR sensor, the conventional hard bias method was improved and thus a lead overlaid structure MR thin-film magnetic head has been proposed. In the lead overlaid structure, lead conductor films are inwardly extended from domain control films and overlapped on the SVMR multi-layered film or the MR film so that a space between the lead conductor films is narrower than the actual width of the SVMR multi-layered film or the MR film.

Such lead overlaid structure MR thin-film magnetic head is described in Japanese patent publication Nos. 11053716A and 2000099926A. Japanese patent publication No. 11053716A discloses forming of electrode films or lead conductor films with a two-layered structure by a reactive ion etching (RIE), and Japanese patent publication No. 2000099926A discloses forming of an upper layer of two-layered structure electrode films with a material that is difficult to etch by RIE so as to use this upper layer as a mask for RIE of an under layer of the electrode films.

However, there may occur following problems when lead conductor films of the lead overlaid structure MR thin-film magnetic head are patterned by RIE.

In case that a chlorine base gas is used as a reactive gas for RIE, it is impossible to increase a selective ratio in etching rate for the lead conductor material with respect to the mask material because of the corrosive nature of the chlorine base gas. Whereas in case a fluorine base gas is used as a reactive gas for RIE, it is impossible to control the width and to increase the selective ratio due to occurrence of deposition. If the selective ratio in etching rates is low, it is necessary to use a sufficiently thick mask layer causing not only a precise patterning to make difficult but also a deposition process time for the mask layer to increase and therefore a total manufacturing time to increase.

SUMMARY OF THE INVENTION

It is therefore an object of the present invention to provide a novel MR thin-film magnetic head of a lead overlaid structure with a more precise narrow reproduction track width and a manufacturing method of the MR thin-film magnetic head.

Another object of the present invention is to provide a novel MR thin-film magnetic head of a lead overlaid structure and a novel manufacturing method of the MR thin-film magnetic head, whereby a manufacturing process time will not increase.

According to the present invention, a manufacturing method of an MR thin-film magnetic head with an MR film and lead conductors overlapping each other, includes a step of depositing a conductor layer on at least the magnetoresistive effect film, a step of forming a cap layer patterned on the deposited conductor layer, and a step of dry-etching the deposited conductor layer through a mask of the patterned cap layer using an argon (Ar) gas and an oxygen ($O_2$) gas, an $O_2$ gas or a nitrogen ($N_2$) gas so as to pattern the deposited conductor film to form the lead conductors.

In fabricating an MR thin-film magnetic head with a lead overlaid structure, a conductor layer is dry-etched through a mask of a patterned cap layer formed on the conductor layer using Ar and $O_2$ gas, $O_2$ gas or $N_2$ gas without executing RIE and thus patterned lead conductors are obtained. Not an RIE which utilizes both chemical characteristics and physical energy of particles but an dry-etching using Ar and $O_2$ gas, $O_2$ gas or $N_2$ gas, which utilizes physical energy of particles, is performed through a mask of Ta, Ti or else. Therefore, according to the present invention, no corrosion due to a chlorine base gas used as a reactive gas for RIE will occur and a selective ratio in etching rate for the lead conductor material with respect to the mask material can be increased. Also, no deposition due to a fluorine base gas used as a reactive gas for RIE will occur and the width can be easily controlled resulting an extremely high selective ratio in etching rates. Therefore, it is possible to thin a cap layer that is used as a mask and to fabricate a lead overlaid structure with a more precise and narrow reproducing track width.

Furthermore, since a deposition process time for the cap layer can be reduced resulting a total manufacturing time to reduce.

It is preferred that the cap layer is made of a tantalum (Ta), a Ta alloy, a titanium (Ti), a Ti alloy, or a nitride of a Ta, a Ta alloy, a Ti or a Ti alloy.

It is also preferred that the conductor layer is made of a gold (Au) or an Au alloy.

It is preferred that the forming step of the cap layer includes depositing a cap layer on the deposited conductor layer, forming a resist pattern on the deposited cap layer, and etching the deposited cap layer through a mask of the resist pattern using a fluorine based gas to pattern the cap layer.

It is further preferred that the fluorine based gas is a carbon tetrafluoride ($CF_4$) gas, a hexafluoromethane ($C_2F_6$) gas or a sulfur hexafluoride gas ($SF_6$).

It is preferred that the method further includes a step of removing the resist pattern by ashing using an oxygen gas after the etching of the deposited cap layer.

It is also preferred that the forming step of the cap layer includes forming a resist pattern on the deposited conductor layer, depositing a cap layer on the deposited conductor layer through the resist pattern, and lifting-off the resist pattern.

It is preferred that the method further includes a step of depositing an etching stop film on at least the magnetoresistive effect film, and then depositing the conductor layer thereon.

It is further preferred that the etching stop film is made of a Ta, a Ta alloy, a Ti, a Ti alloy, or a nitride of a Ta, a Ta alloy, a Ti or a Ti alloy.

It is preferred that the dry-etching step includes dry-etching using a nitrogen gas with conditions of a bias power and a gas pressure to obtain a desired taper angle of end surfaces of the lead conductors.

According to the present invention, an MR thin-film magnetic head includes an MR film, lead conductors formed to overlap the MR film and made of an Au or an Au alloy, and a patterned cap layer formed on the lead conductors and made of made of a Ta, a Ta alloy, a Ti, a Ti alloy, or a nitride of a Ta, a Ta alloy, a Ti or a Ti alloy.

It is preferred that the magnetic head further includes an etching stop film formed on at least the MR film and made of a Ta, a Ta alloy, a Ti, a Ti alloy, or a nitride of a Ta, a Ta alloy, a Ti or a Ti alloy.

Further objects and advantages of the present invention will be apparent from the following description of the preferred embodiments of the invention as illustrated in the accompanying drawings.

DESCRIPTION OF THE PREFERRED EMBODIMENTS

Figure 1:
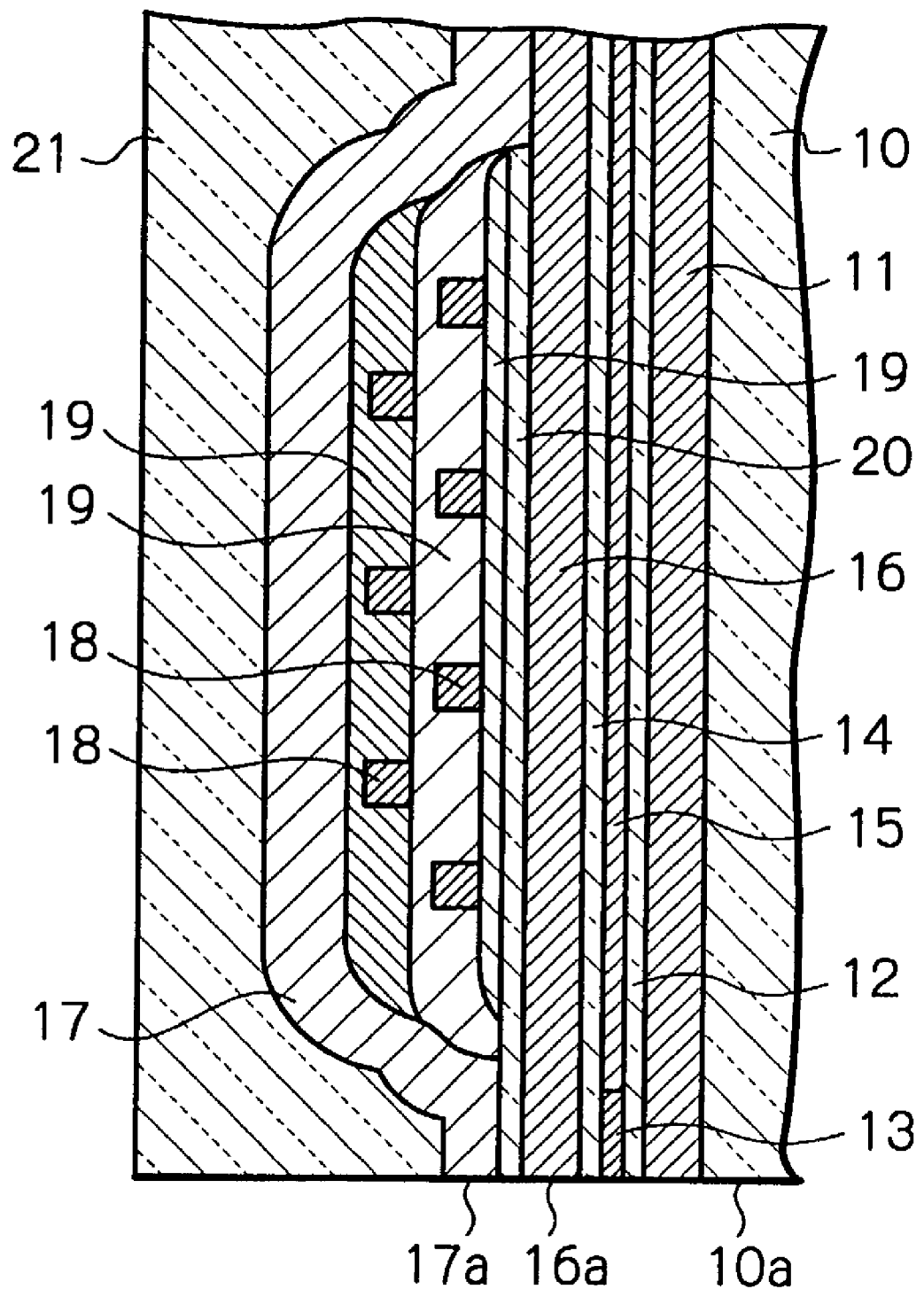
FIG. 1 shows a sectional view schematically illustrating a main portion of a thin-film magnetic head fabricated in a preferred embodiment according to the present invention.
Figure 2:
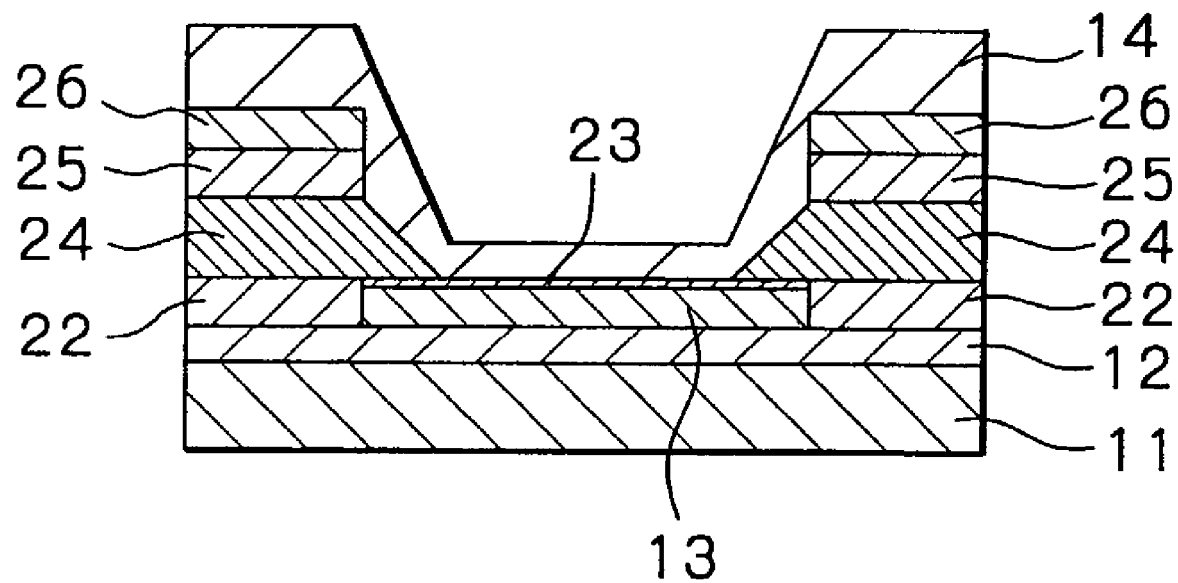
FIG. 2 shows a sectional view seen from an air bearing surface (ABS) illustrating an MR sensor fabricated in the embodiment of FIG. 1.

FIG. 1 schematically illustrates a main portion of a thin-film magnetic head fabricated in a preferred embodiment according to the present invention, and FIG. 2 illustrates an MR sensor fabricated in this embodiment, seen from an ABS. The thin-film magnetic head in this embodiment is a composite thin-film magnetic head provided with an MR read sensor and an inductive electromagnetic write transducer element.

In FIG. 1, reference numeral 10 denotes a substrate that constitutes the most part of a magnetic head slider, 11 denotes a lower shield layer formed on the slider 10 via an under film (not shown), 12 denotes a lower shield gap layer laminated on the lower shield layer 11, 14 denotes an upper shield gap layer, 15 denotes a shield gap layer, 16 an upper shield layer that also functions as a lower magnetic layer of the write head portion, 13 denotes an MR film formed along the ABS 10a and sandwiched by the lower and upper shield gap layers 12 and 14 between the lower and upper shield layers 11 and 16, 17 denotes an upper magnetic layer, 18 denotes a coil conductor layer surrounded by an insulation layer 19 made of an organic resin, 20 denotes a magnetic gap layer, and 21 denotes a protection layer, respectively.

One end sections of the lower and upper magnetic layers 16 and 17 constitute magnetic poles 16a and 17a facing to each other with a very narrow space of the magnetic gap layer 20. These magnetic poles 16a and 17a perform writing operation of magnetic information onto a magnetic medium. The lower and upper magnetic layers 16 and 17 constitute yokes. The other end sections of these lower and upper magnetic layers 16 and 17, which are opposite side to the magnetic poles 16a and 17a, constitute a back-gap coupled with each other to complete a magnetic circuit. The coil conductor layer 18 is formed on the insulation layer 19 so to be wound in a spiral around the coupled back-gap of the yokes.

The MR sensor fabricated in this embodiment includes, as shown in FIG. 2 in detail, the lower shield layer 11 made of NiFe for example, the lower shield gap layer 12 laminated on thereon and made of $Al_2O_3$ or $SiO_2$ for example, the MR film 13 (thickness of about 40–60 nm) formed on the lower shield gap layer 12 and constituted by a SVMR multi-layered film or an AMR single layer film, domain control layers 22 (thickness of about 60–80 nm) formed on the lower shield gap layer 12 to contact with both ends in track width directions of the MR film 13 and made of Co based alloy for example, an etching stop film 23 laminated at least on the MR film 13, normally on both the MR film 13 and the domain control layers 22, first lead conductors 24 (thickness of about 20–60 nm) laminated on the etching stop film 23 above the MR film 13 and the domain control layers 22 so as to partially overlap with the end sections of the MR film 13, patterned cap layers 24 laminated on the first lead conductors 24, second lead conductors 26 (thickness of about 50–120 nm) laminated on the cap layers 25, and the upper shield gap layer 14 made of $Al_2O_3$ or $SiO_2$ for example.

The cap layers 25 and the etching stop film 23 are made of Ta in this embodiment. However, the cap layer and/or the etching stop film may be made of Ta alloy, Ti, Ti alloy, or nitride of Ta, Ta alloy, Ti or Ti alloy other than Ta.

The first lead conductors 24 are made of Au in this embodiment. However, the first lead conductors may be made of Au alloy such as AuCu, AuNi, AuSi and AuTi other than Au.

FIGS. 3a to 3g illustrate a part of a manufacturing process of the MR sensor in the embodiment of FIG. 1.

First, the under film (not shown) is deposited on the substrate 10 of AlTiC for example shown in FIG. 1 and the under shield layer 11 of NiFe for example is formed by plating for example on the under layer. The lower shield gap layer 12 of $Al_2O_3$ or $SiO_2$ for example is deposited thereon.

Figure 3A:
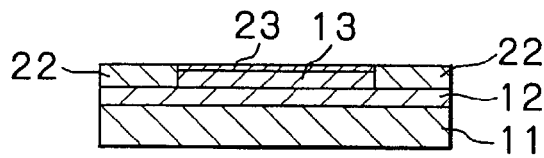
FIGS. 3a to 3g show sectional views seen from the ABS illustrating a part of a manufacturing process of the MR sensor in the embodiment of FIG. 1.

Then, an MR film of a SVMR multi-layered film or an AMR single layer film is deposited on the lower shield gap layer 12 and an etching stop film of Ta is deposited thereon. Then, a lift-off pattern is formed by photolithography and the MR film and the etching stop film are etched by for example ion milling through the lift-off pattern. Then, a domain control film of CoPt for example is deposited without removing the lift-off pattern and thereafter the pattern is lifted-off to form the patterned MR film 13, the patterned etching stop film 23 and the patterned domain control films 22 as shown in FIG. 3a.

Figure 3B:
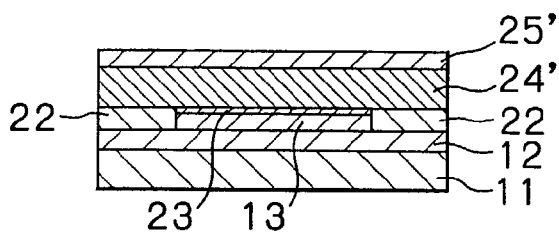

Then, as shown in FIG. 3b, a conductor layer 24' of Au is deposited on the etching stop film 23 and the domain control films 22 and a cap layer 25' is deposited thereon.

Figure 3C:
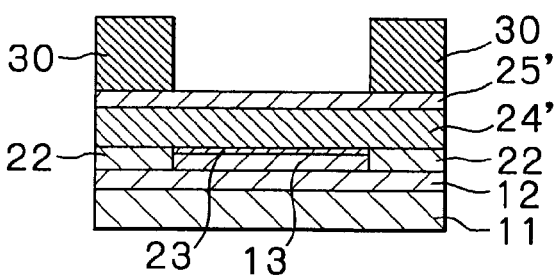

Then, as shown in FIG. 3c, a resist pattern 30 is formed on the cap layer 25' of Ta by photolithography.

Thereafter, the cap layer 25' is etched through a mask of the resist pattern 30 using $CF_4$ gas to obtain a patterned cap layer 25. Table 1 shows the conditions of this etching process.

TABLE 1

| Used gas | Flow amount of gas (sccm) | Micro wave (W) | RF (W) | Pressure (mTorr) | Time (sec) | Etching rate of Ta (nm/min) | Etching rate of resist (nm/min) | Selective ratio of Ta against resist |
|---|---|---|---|---|---|---|---|---|
| $CF_4$ | 80 | 600 | 10 | 2 | 25 | 50.05 | About 200 | About 0.25 |

Figure 3D:
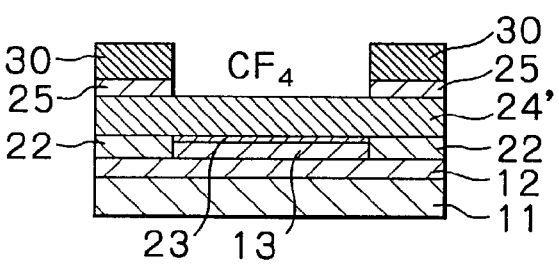

FIG. 3d shows a layer structure after the etching process. It is possible to prevent occurrence of a burr of the etched cap layer 25' by executing this etching process under the optimum conditions using $CF_4$ gas. In stead of the $CF_4$ gas, any gas with a relatively large selective ratio between the resist material and the cap layer material such as $C_2F_6$ gas or $SF_6$ gas for example may be used.

Then, the resist pattern 30 is removed by an ashing process using $O_2$ gas. Table 2 shows the conditions of this ashing process.

TABLE 2

| Used gas | Flow amount of gas (sccm) | Micro wave (W) | RF (W) | Pressure (mTorr) | Time (sec) | Etching rate of resist (nm/min) |
|---|---|---|---|---|---|---|
| $O_2$ | 200 | 1000 | 5 | 3 | 180 | About 250 |

Figure 3E:
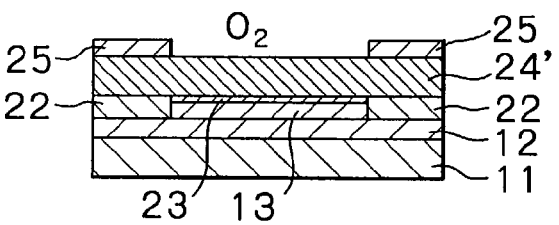

FIG. 3e shows a layer structure after the ashing process. It should be noted that the cap layer 25 located beneath the resist pattern 30 is hardly etched under these conditions.

The conductor layer 24' of Au is dry-etched through a mask of the cap layer 25 of Ta using a mix gas of Ar and $O_2$ to obtain the patterned first lead conductors 24. Table 3 shows an example of the conditions of this dry-etching process.

TABLE 3

| Used gas | Flow amount of gas (sccm) | Micro wave (W) | RF (W) | Pressure (mTorr) | Time (sec) | Etching rate of Au (nm/min) | Etching rate of Ta (nm/min) | Selective ratio of Au against Ta |
|---|---|---|---|---|---|---|---|---|
| Ar/O$_2$ | 70/30 | 600 | 20 | 2 | 147 | 26.54 | 0.766 | 34.6 |

Figure 3F:
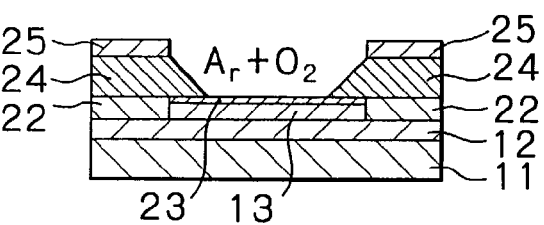

FIG. 3*f* shows a layer structure after the dry-etching process.

Figure 3G:
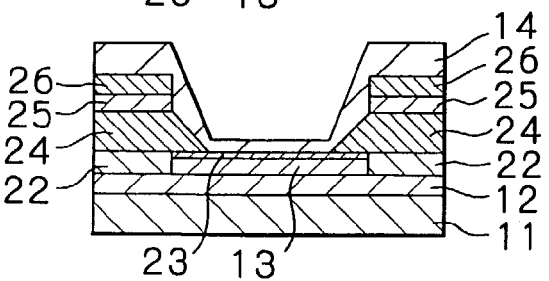

Thereafter, as shown in FIG. 3*g*, the second lead conductors 26 are formed on the cap layer 25, and the upper shield gap layer 14 of Al$_2$O$_3$ or SiO$_2$ for example is deposited thereon.

Since the conductor layer 24' is dry-etched using the mix gas and Ar and O$_2$ in this embodiment, this conductor layer 24' or Au can be precisely etched with a reliability even when the mask of the cap layer 25 made of Ta is thinned. This is because a selective ratio of Au with respect to Ta is a very high value such as 34.6.

Figure 4:
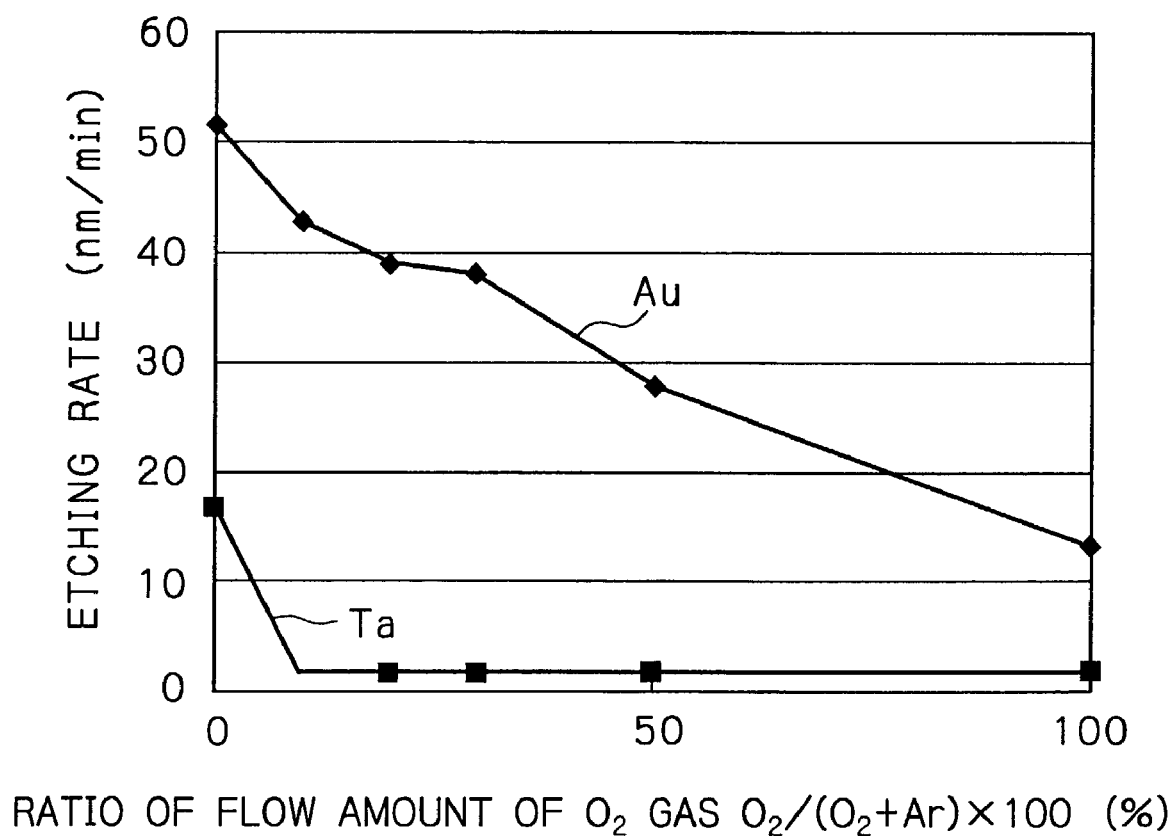
FIG. 4 shows a graph illustrating an actually measured result of etching rates of Au and Ta with respect to a ratio of flow amount of $O_2$ gas.

This selective ratio of Au with respect to Ta varies depending upon a mixed ratio of Ar and O$_2$. FIG. 4 illustrates an actually measured result of etching rates of Au and Ta with respect to a ratio of flow amount of O$_2$ gas, and Table 4 shows etching rates of Au and Ta and selective ratios of Au against Ta with respect to ratios of flow amount of O$_2$ gas. The flow amount ratio of O$_2$ gas was calculated from (Flow amount of O$_2$ gas)/(Flow amount of O$_2$ gas+Flow amount of Ar gas)×100 (%). Conditions of this measurement were a microwave power of 800 W, a bias RF power of 60 W and a gas pressure of 0.27 Pa. Differences between the measured etching rates and selective ratios shown in Table 4 and those shown in Table 3 are due to different etching devices used for measurements.

TABLE 4

| Ratios of flow amount of O$_2$ gas, O$_2$/(O$_2$ + Ar) × 100 (%) | Etching rate of Au (nm/min) | Etchig rate of Ta (nm/min) | Selective ratio of Au against Ta |
|---|---|---|---|
| 0 | 51.40 | 16.67 | 3.1 |
| 10 | 42.78 | 1.67 | 25.6 |
| 20 | 39.12 | 1.59 | 24.6 |
| 30 | 37.95 | 1.51 | 25.1 |
| 50 | 27.81 | 1.46 | 19.0 |
| 100 | 13.22 | 1.47 | 9.0 |

As will be noted from Table 4, a very high selective ratio such as 24 or more can be obtained if the flow amount ratio of O$_2$ gas is within a range of 10–30%.

A taper angle of end surfaces of the first lead conductors 24 can be controlled by adjusting the gas pressure and the bias RF power for the dry-etching process using a mix gas of Ar and O$_2$. If the end surfaces of the first lead conductors 24 are steeply tapered, no upper shield gap layer 14 is deposited on these end surfaces and thus the first lead conductor 24 and the upper shield layer 16 may be short-circuited to each other. Therefore, it is very important to control the taper angle of these end surfaces so that the end surfaces become somewhat gentle.

Figure 5:
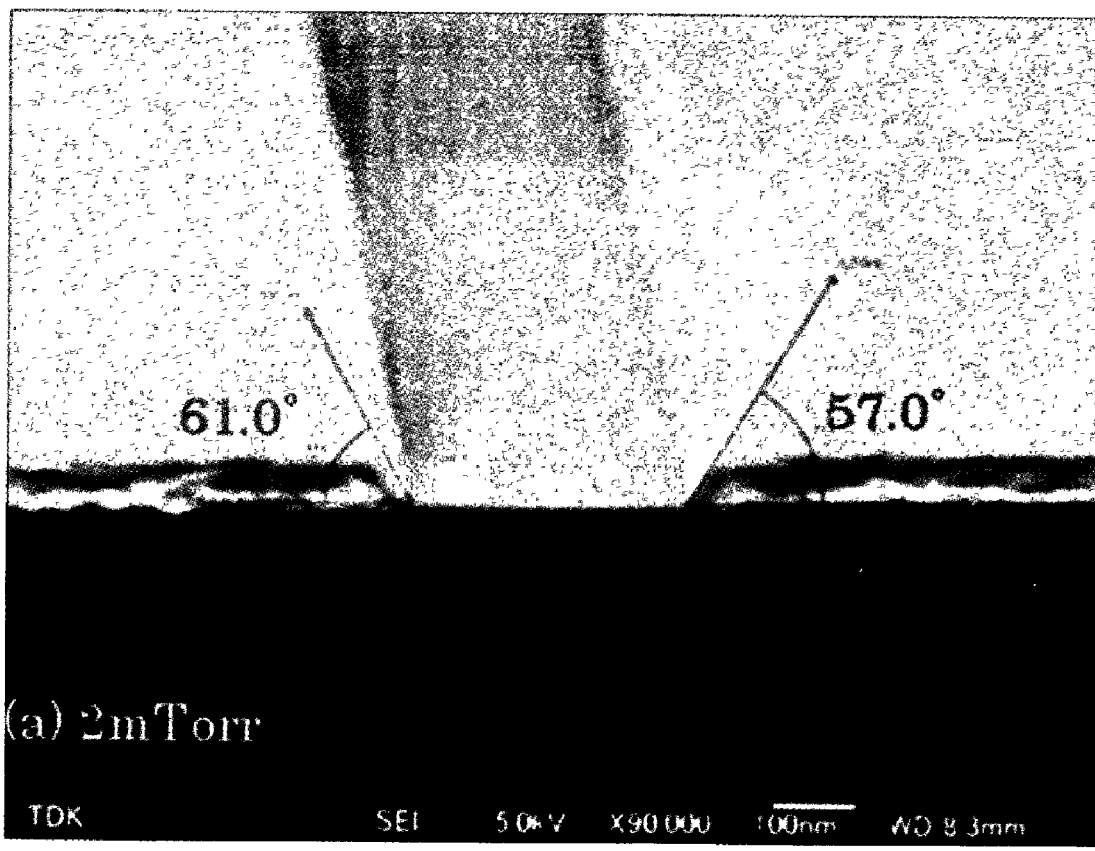
FIGS. 5 and 6 show scanning electron microscope (SEM) photographs seen from a slanting direction illustrating edge surfaces of first lead conductors of samples formed by dry-etching with different gas pressures with each other.
Figure 6:
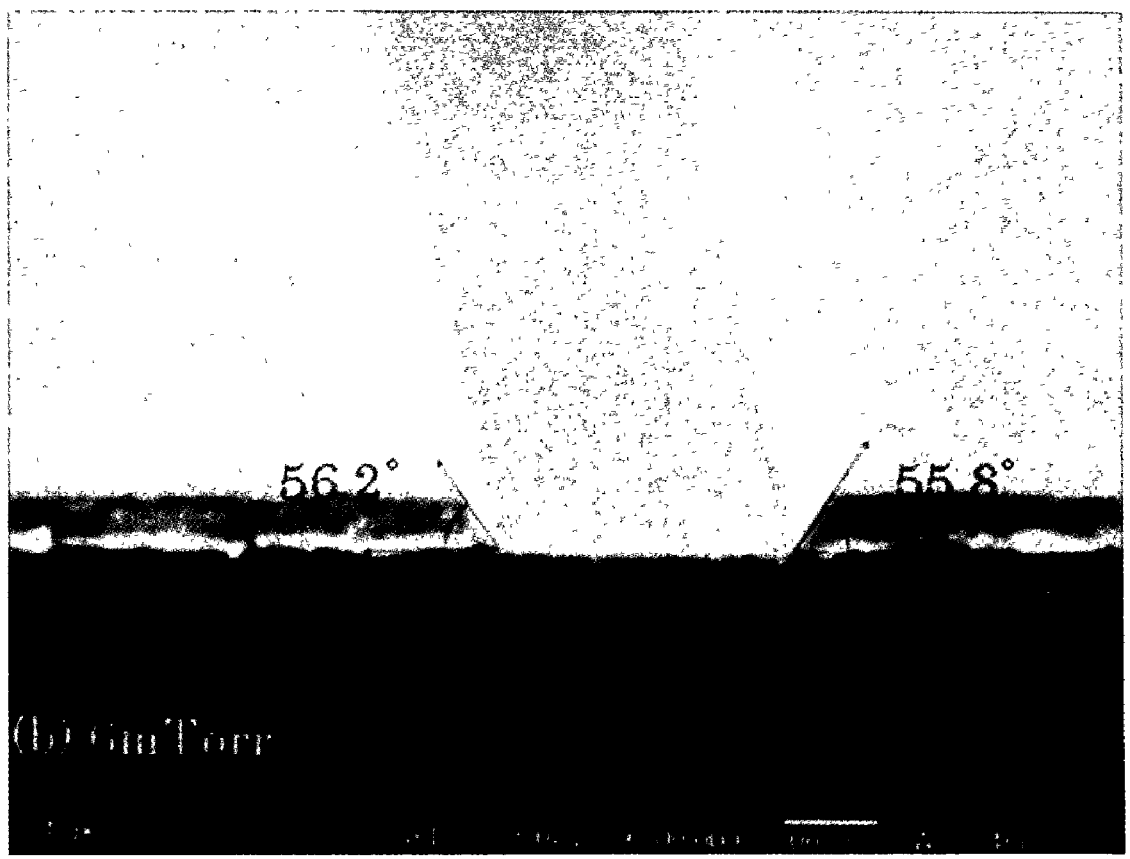
Figure 7:
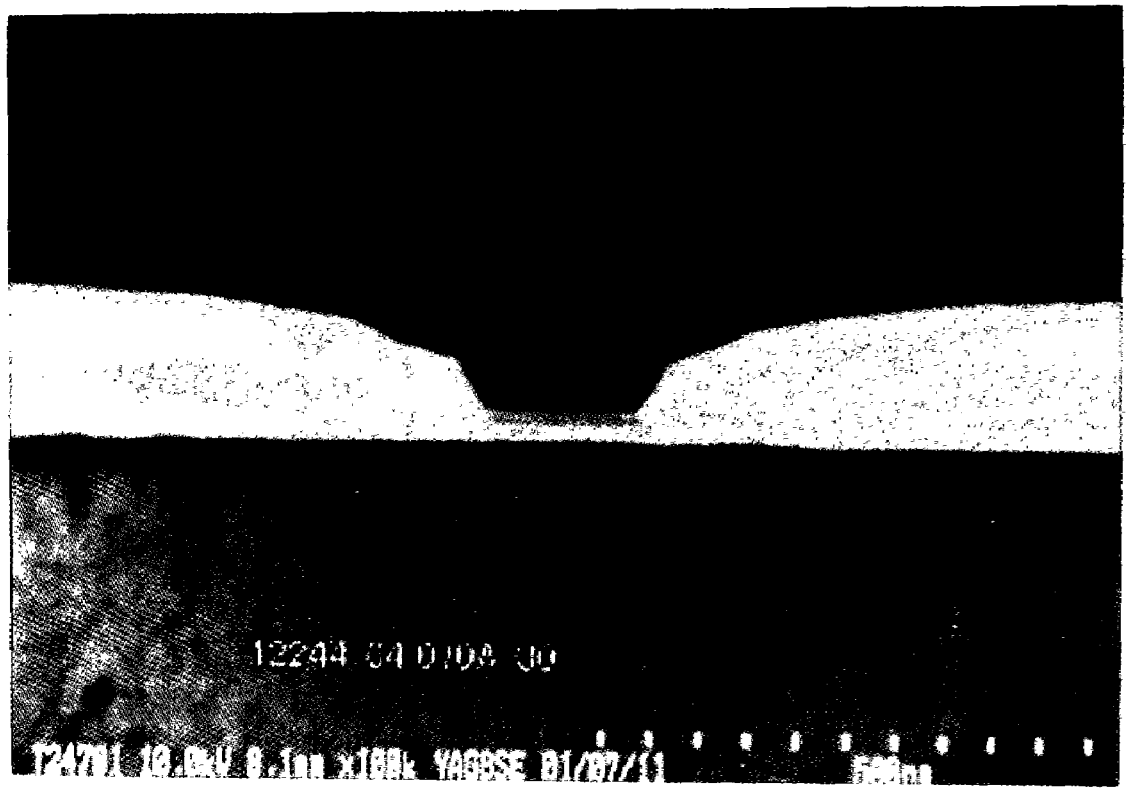
FIGS. 7 to 9 show SEM photographs illustrating a section of edge surfaces of first lead conductors of samples formed by dry-etching with different gas pressures with each other.
Figure 8:
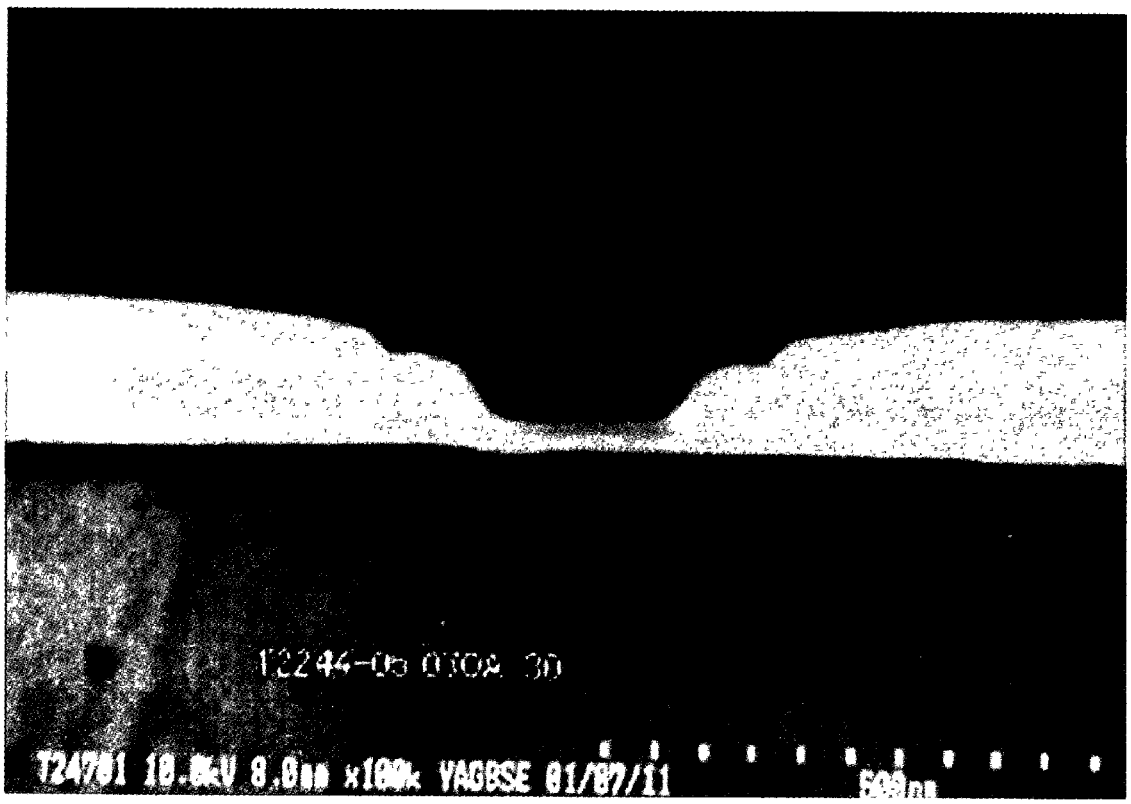
Figure 9:

FIGS. 5 and 6 are SEM photographs seen from a slanting direction illustrating the edge or end surfaces of the first lead conductors 24 of samples formed by dry-etching with different gas pressures with each other, and FIGS. 7 to 9 are SEM photographs illustrating a section of the edge or end surfaces of the first lead conductors 24 of samples formed by dry-etching with different gas pressures with each other Table 5 shows the conditions of the etching process for the cap layer, conditions of the ashing process for the resist pattern and conditions of the etching process for the lead conductors of the sample shown in FIG. 5.

TABLE 5

| Process | Used gas | Flow amount of gas (sccm) | Micro wave (W) | RF (W) | Pressure (mTorr) | Time (sec) |
|---|---|---|---|---|---|---|
| Etching of cap layer | CF$_4$ | 80 | 600 | 20 | 2 | 25 |
| Ashing of resist | O$_2$ | 200 | 1000 | 5 | 3 | 180 |
| Etching of lead conductor | Ar/O$_2$ | 70/30 | 800 | 20 | 2 | 92 |

In this sample, the taper angle of the end surfaces of the first lead conductors 24 was about 59.0 degrees.

Table 6 shows the conditions of the etching process for the cap layer, conditions of the ashing process for the resist pattern and conditions of the etching process for the lead conductors of the sample shown in FIG. 6.

TABLE 6

| Process | Used gas | Flow amount of gas (sccm) | Micro wave (W) | RF (W) | Pressure (mTorr) | Time (sec) |
|---|---|---|---|---|---|---|
| Etching of cap layer | CF$_4$ | 80 | 600 | 20 | 2 | 25 |
| Ashing of resist | O$_2$ | 200 | 1000 | 5 | 3 | 180 |
| Etching of lead conductor | Ar/O$_2$ | 70/30 | 800 | 20 | 6 | 126 |

In this sample, the taper angle of the end surfaces of the first lead conductors 24 was about 56.0 degrees. Thus, it will be understood that the taper angle can be controlled more gently than that of the sample of FIG. 5 by changing the gas pressure during the etching process for the first lead conductors from 2 mTorr to 6 mTorr.

Table 7 shows the conditions of the etching process for the cap layer, conditions of the ashing process for the resist pattern and conditions of the etching process for the lead conductors of the sample shown in FIG. 7.

TABLE 7

| Process | Used gas | Flow amount of gas (sccm) | Micro wave (W) | RF (W) | Pressure (mTorr) | Time (sec) |
|---|---|---|---|---|---|---|
| Etching of cap layer | CF$_4$ | 80 | 600 | 20 | 2 | 25 |
| Ashing of resist | O$_2$ | 200 | 1000 | 30 | 3 | 180 |
| Etching of lead conductor | Ar/O$_2$ | 70/30 | 800 | 20 | 2 | 138 |

In this sample, the taper angle of the end surfaces of the first lead conductors 24 was about 60.5 degrees.

Table 8 shows the conditions of the etching process for the cap layer, conditions of the ashing process for the resist pattern and conditions of the etching process for the lead conductors of the sample shown in FIG. 8.

TABLE 8

| Process | Used gas | Flow amount of gas (sccm) | Micro wave (W) | RF (W) | Pressure (mTorr) | Time (sec) |
|---|---|---|---|---|---|---|
| Etching of cap layer | CF$_4$ | 80 | 600 | 20 | 2 | 25 |
| Ashing of resist | O$_2$ | 200 | 1000 | 30 | 3 | 180 |
| Etching of lead conductor | Ar/O$_2$ | 70/30 | 800 | 20 | 5 | 171 |

In this sample, the taper angle of the end surfaces of the first lead conductors 24 was about 56.5 degrees. Thus, it will be understood that the taper angle can be controlled more gently than that of the sample of FIG. 7 by changing the gas pressure during the etching process for the first lead conductors from 2 mTorr to 5 mTorr.

Table 9 shows the conditions of the etching process for the cap layer, conditions of the ashing process for the resist pattern and conditions of the etching process for the lead conductors of the sample shown in FIG. 9.

TABLE 9

| Process | Used gas | Flow amount of gas (sccm) | Micro wave (W) | RF (W) | Pressure (mTorr) | Time (sec) |
|---|---|---|---|---|---|---|
| Etching of cap layer | CF$_4$ | 80 | 600 | 20 | 2 | 25 |
| Ashing of resist | O$_2$ | 200 | 1000 | 30 | 3 | 180 |

TABLE 9-continued

| Process | Used gas | Flow amount of gas (sccm) | Micro wave (W) | RF (W) | Pressure (mTorr) | Time (sec) |
|---|---|---|---|---|---|---|
| Etching of lead conductor | Ar/O$_2$ | 70/30 | 800 | 20 | 9 | 283 |

In this sample, the taper angle of the end surfaces of the first lead conductors 24 was about 45.5 degrees. Thus, it will be understood that the taper angle can be controlled still more gently than that of the sample of FIG. 8 by further changing the gas pressure during the etching process for the first lead conductors from 5 mTorr to 9 mTorr.

Figure 10:
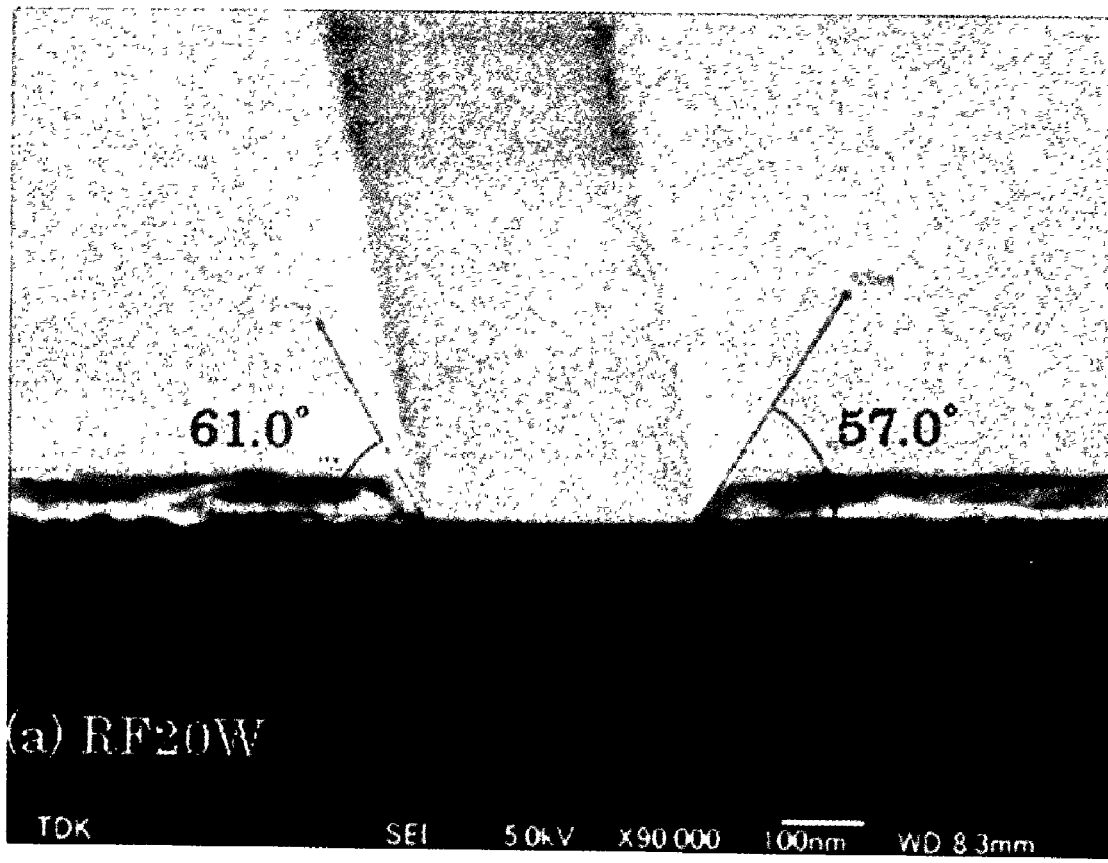
FIGS. 10 and 11 show SEM photographs seen from a slanting direction illustrating edge surfaces of first lead conductors of samples formed by dry-etching with different bias RF powers with each other.
Figure 11:
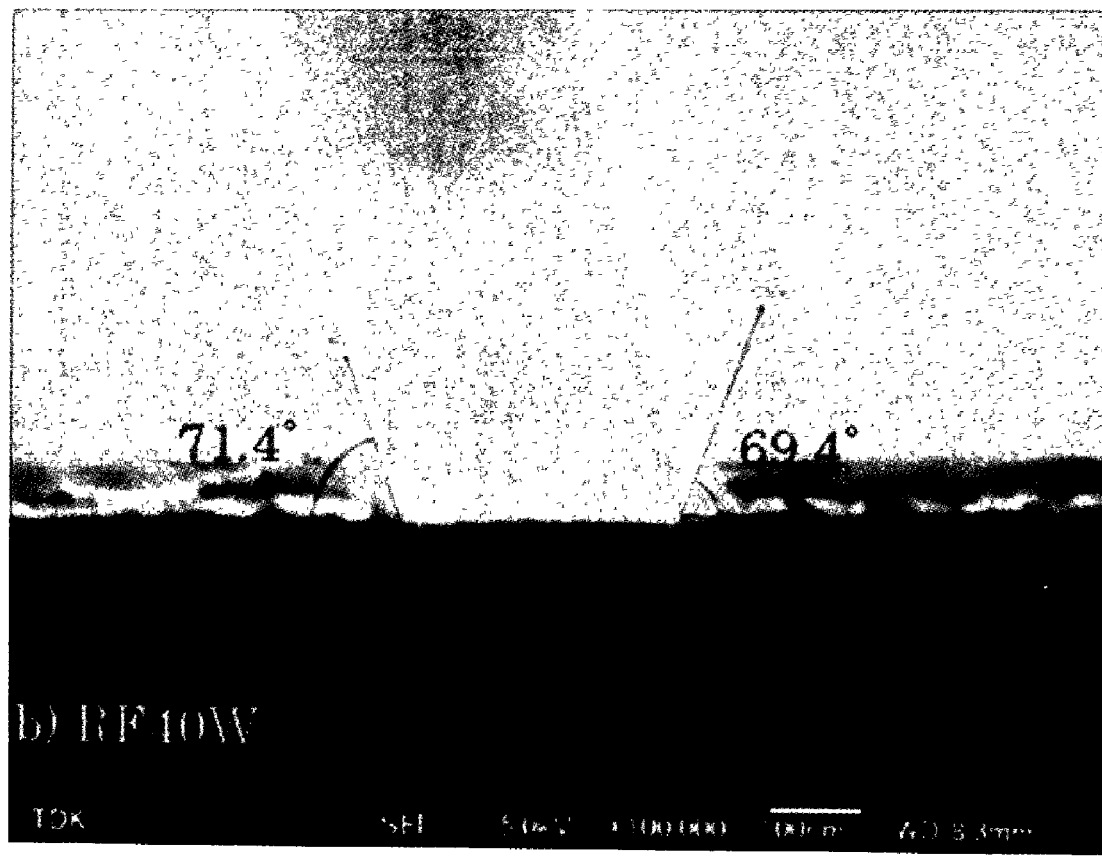

FIGS. 10 and 11 are SEM photographs seen from a slanting direction illustrating the edge or end surfaces of the first lead conductors 24 of samples formed by dry etching with different bias RF powers with each other.

The conditions of the etching process for the cap layer, conditions of the ashing process for the resist pattern and conditions of the etching process for the lead conductors of the sample of FIG. 10 are the same as those of the sample of FIG. 5 and shown in Table 5. The taper angle of the end surfaces of the first lead conductors 24 in this sample was about 59.0 degrees.

Table 10 shows the conditions of the etching process for the cap layer, conditions of the ashing process for the resist pattern and conditions of the etching process for the lead conductors of the sample shown in FIG. 11.

TABLE 10

| Process | Used gas | Flow amount of gas (sccm) | Micro wave (W) | RF (W) | Pressure (mTorr) | Time (sec) |
|---|---|---|---|---|---|---|
| Etching of cap layer | CF$_4$ | 80 | 600 | 20 | 2 | 25 |
| Ashing of resist | O$_2$ | 200 | 1000 | 5 | 3 | 180 |
| Etching of lead conductor | Ar/O$_2$ | 70/30 | 800 | 40 | 2 | 45 |

In this sample, the taper angle of the end surfaces of the first lead conductors 24 was about 70.4 degrees. Thus, it will be understood that the taper angle is controlled more steeply than that of the sample of FIG. 10 by changing the RF power during the etching process for the first lead conductors from 20 W to 40 W.

Table 11 shows measured results of selective ratios of Au and Au alloys against Ta when the first lead conductor 24 was made of Au or Au alloys.

TABLE 11

| Lead conductor material | Content ratio (at %) | Used gas | Flow amount of gas (sccm) | Micro wave (W) | RF (W) | Pressure (mTorr) | Etching rate (nm/min) | Selective ratio against Ta |
|---|---|---|---|---|---|---|---|---|
| Au | — | Ar/O$_2$ | 70/30 | 600 | 20 | 2 | 25.31 | 33.0 |
| AuCu | 1.96 | Ar/O$_2$ | 70/30 | 600 | 20 | 2 | 24.32 | 31.7 |
| AuCu | 5.98 | Ar/O$_2$ | 70/30 | 600 | 20 | 2 | 24.16 | 31.5 |

TABLE 11-continued

| Lead conductor material | Content ratio (at %) | Used gas | Flow amount of gas (sccm) | Micro wave (W) | RF (W) | Pressure (mTorr) | Etching rate (nm/min) | Selective ratio against Ta |
|---|---|---|---|---|---|---|---|---|
| AuNi | 3.15 | Ar/O$_2$ | 70/30 | 600 | 20 | 2 | 24.87 | 32.5 |
| AuNi | 9.32 | Ar/O$_2$ | 70/30 | 600 | 20 | 2 | 23.86 | 31.1 |

As will be apparent from Table 11, such low Cu or Ni content of the Au alloys results to substantially keep the selective ratio of etching rate against Ta at a high value without changing. Therefore, the first lead conductors 24 may be formed by an Au alloy of AuCu, AuNi. AuSi or AuTi other than Au to obtain the similar good effect.

FIGS. 12a to 12g illustrate a part of a manufacturing process of an MR sensor in another embodiment according to the present invention.

Figure 12A:
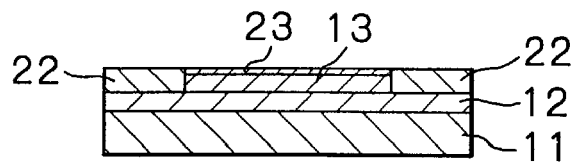
FIGS. 12a to 12g show sectional views seen from an ABS illustrating a part of a manufacturing process of an MR sensor in another embodiment according to the present invention.

First, as well as the embodiment of FIG. 1, an under film (not shown) is deposited on a substrate 10 of AlTiC and an under shield layer 11 of NiFe for example is formed by plating for example on the under layer. A lower shield gap layer 12 of Al$_2$O$_3$ or SiO$_2$ for example is deposited thereon. Then, an MR film of a SVMR multi-layered film or an AMR single layer film is deposited on the lower shield gap layer 12 and an etching stop film of Ta is deposited thereon. Then, a lift-off pattern is formed by photolithography and the MR film and the etching stop film are etched by for example ion milling through the lift-off pattern. Then, a domain control film of CoPt for example is deposited without removing the lift-off pattern and thereafter the pattern is lifted-off to form the patterned MR film 13, the patterned etching stop film 23 and the patterned domain control films 22 as shown in FIG. 12a.

Figure 12B:
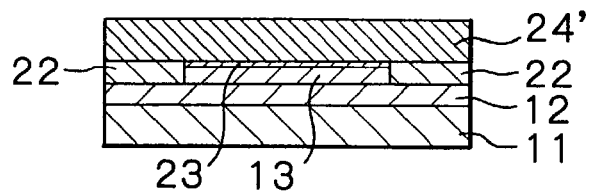

Then, as shown in FIG. 12b, a conductor layer 24' of Au is deposited on the etching stop film 23 and the domain control films 22.

Figure 12C:
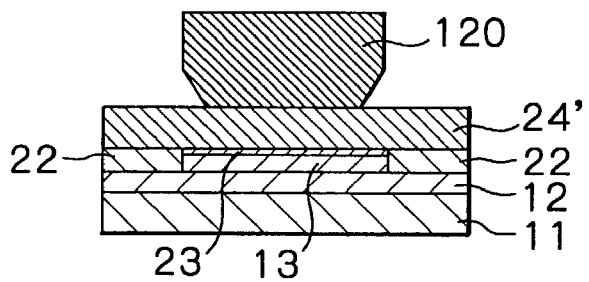

Then, as shown in FIG. 12c, a resist pattern 120 is formed on the conductor layer 24' by photolithography.

Figure 12D:
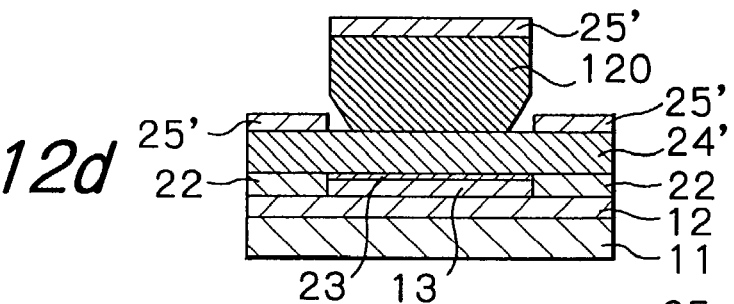

Then, as shown in FIG. 12d, a cap layer 25' of Ta is deposited on the resist pattern 120 and the conductor layer 24'.

Figure 12E:
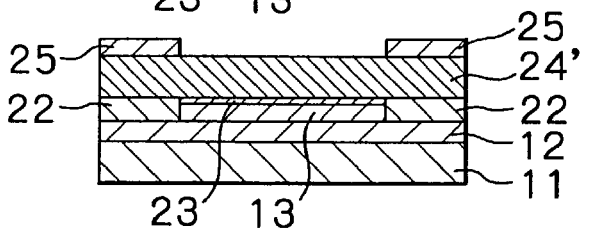

Thereafter, the resist pattern 120 and Ta deposited thereon are removed by executing the lift-off process to obtain a patterned cap layer 25. FIG. 12e shows a layer structure after the lift-off process.

Figure 12F:
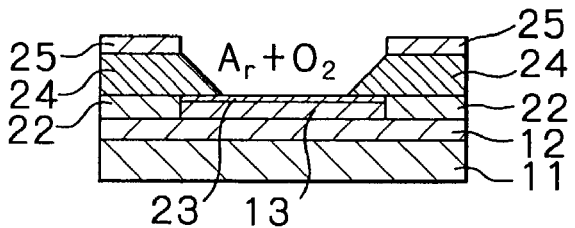

Then, the conductor layer 24' of Au is dry-etched through a mask of the cap layer 25 of Ta using a mix gas of Ar and O$_2$ to obtain the patterned first lead conductors 24. Conditions of this dry-etching process are the same as shown in Table 3 for example. FIG. 12f shows a layer structure after the dry-etching process.

Figure 12G:
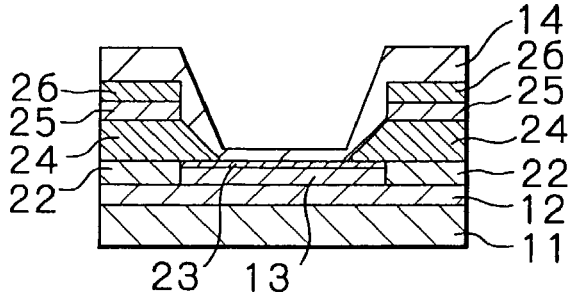

Thereafter, as shown in FIG. 12g, second lead conductors 26 are formed on the cap layer 25, and an upper shield gap layer 14 of Al$_2$O$_3$ or SiO$_2$ for example is deposited thereon.

Since the conductor layer 24' is dry-etched using the mix gas of Ar and O$_2$ in this embodiment, this conductor layer 24' of Au can be precisely etched with a reliability even when the mask of the cap layer 25 made of Ta is thinned. This is because a selective ratio of Au with respect to Ta is a very high value such as 34.6.

The cap layers 25 and the etching stop film 23 are made of Ta in this embodiment. However, the cap layer and/or the etching stop film may be made of Ta alloy, Ti, Ti alloy, or nitride of Ta, Ta alloy, Ti or Ti alloy other than Ta.

The first lead conductors 24 are made of Au in this embodiment. However, the first lead conductors may be made of Au alloy such as AuCu, AuNi, AuSi and AuTi other than Au.

Other configurations, operations, advantages and modifications in this embodiment are substantially the same as those in the embodiment of FIG. 1.

FIGS. 13a to 13f illustrate a part of a manufacturing process of an MR sensor in a further embodiment according to the present invention.

Figure 13A:
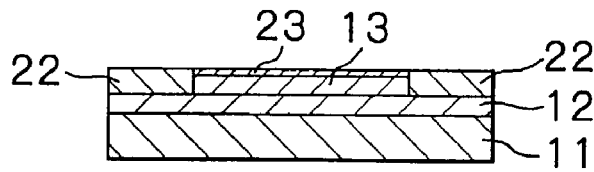
FIGS. 13a to 13f show sectional views seen from an ABS illustrating a part of a manufacturing process of an MR sensor in a further embodiment according to the present invention.

First, as well as the embodiment of FIG. 1, an under film (not shown) is deposited on a substrate 10 of AlTiC and an under shield layer 11 of NiFe for example is formed by plating for example on the under layer. A lower shield gap layer 12 of Al$_2$O$_3$ or SiO$_2$ for example is deposited thereon. Then, an MR film of a SVMR multi-layered film or an AMR single layer film is deposited on the lower shield gap layer 12 and an etching stop film of Ta is deposited thereon. Then, a lift-off pattern is formed by photolithography and the MR film and the etching stop film are etched by for example ion milling through the lift-off pattern. Then, a domain control film of CoPt for example is deposited without removing the lift-off pattern and thereafter the pattern is lifted-off to form the patterned MR film 13, the patterned etching stop film 23 and the patterned domain control films 22 as shown in FIG. 13a.

Figure 13B:
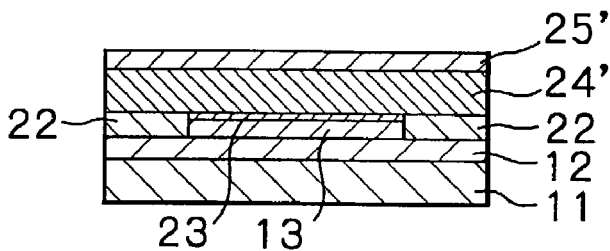

Then, as shown in FIG. 13b, a conductor layer 24' of Au is deposited on the etching stop film 23 and the domain control films 22 and a cap layer 25' of Ta is deposited thereon.

Figure 13C:
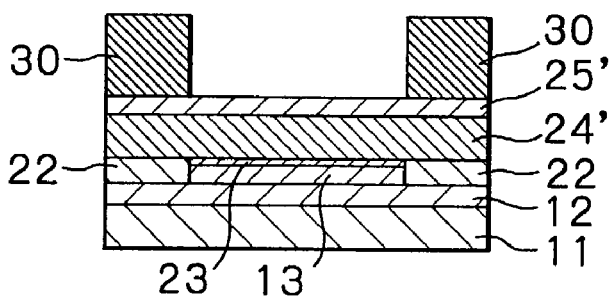

Then, as shown in FIG. 13c, a resist pattern 30 is formed on the cap layer 25' of Ta by photolithography.

Thereafter, the cap layer 25' is etched through a mask of the resist pattern 30 using CF$_4$ gas to obtain a patterned cap layer 25. Conditions of this etching process are the same as shown in Table 1 for example.

Figure 13D:
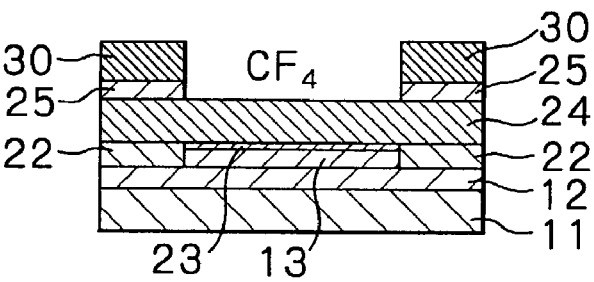

FIG. 13d shows a layer structure after the etching process. It is possible to prevent occurrence of a burr of the etched cap layer 25' by executing this etching process under the optimum conditions using CF$_4$ gas. In stead of the CF$_4$ gas, any gas with a relatively large selective ratio between the resist material and the cap layer material such as C$_2$F$_6$ gas or SF$_6$ gas for example may be used.

Then, by a dry-etching process using O$_2$ gas, the resist pattern 30 is removed and the conductor layer 24' of Au is patterned using the cap layer 25 of Ta as a mask. Table 12 shows the conditions of this dry-etching process.

TABLE 12

| Used gas | Flow amount of gas (sccm) | Micro wave (W) | RF (W) | Pressure (mTorr) | Time (sec) | Etching rate of Au (nm/min) | Etching rate of Ta (nm/min) | Selective ratio of Au against Ta |
|---|---|---|---|---|---|---|---|---|
| O$_2$ | 200 | 1000 | 30 | 3 | 251 | 15.56 | 0.76 | 20.4 |

Figure 13E:
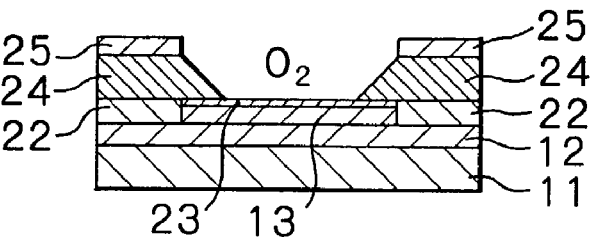

FIG. 13e shows a layer structure after the dry-etching process.

Figure 13F:
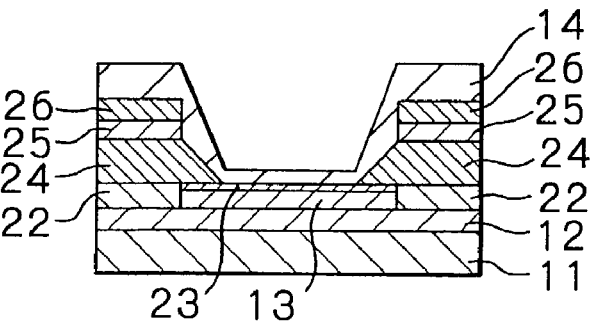

Thereafter, as shown in FIG. 13f, second lead conductors 26 are formed on the cap layer 25, and an upper shield gap layer 14 of Al$_2$O$_3$ or SiO$_2$ for example is deposited thereon.

Since the conductor layer 24' is dry-etched using O$_2$ gas in this embodiment, this conductor layer 24' of Au can be precisely etched with a reliability even when the mask of the cap layer 25 made of Ta is thinned. This is because a selective ratio of Au with respect to Ta is a very high value such as 20.4.

The cap layers 25 and the etching stop film 23 are made of Ta in this embodiment. However, the cap layer and/or the etching stop film may be made of Ta alloy, Ti, Ti alloy, or nitride of Ta, Ta alloy, Ti or Ti alloy other than Ta.

The first lead conductors 24 are made of Au in this embodiment. However, the first lead conductors may be made of Au alloy such as AuCu, AuNi, AuSi and AuTi other than Au.

Other configurations, operations, advantages and modifications in this embodiment are substantially the same as those in the embodiment of FIG. 1.

FIGS. 14a to 14g illustrate a part of a manufacturing process of an MR sensor in a still further embodiment according to the present invention.

Figure 14A:
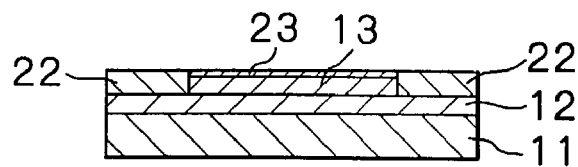
FIGS. 14a to 14g show sectional views seen from an ABS illustrating a part of a manufacturing process of an MR sensor in a still further embodiment according to the present invention.

First, as well as the embodiment of FIG. 1, an under film (not shown) is deposited on a substrate 10 of AlTiC and an under shield layer 11 of NiFe for example is formed by plating for example on the under layer. A lower shield gap layer 12 of Al$_2$O$_3$ or SiO$_2$ for example is deposited thereon. Then, an MR film of a SVMR multi-layered film or an AMR single layer film is deposited on the lower shield gap layer 12 and an etching stop film of Ta is deposited thereon. Then, a lift-off pattern is formed by photolithography and the MR film and the etching stop film are etched by for example ion milling through the lift-off pattern. Then, a domain control film of CoPt for example is deposited without removing the lift-off pattern and thereafter the pattern is lifted-off to form the patterned MR film 13, the patterned etching stop film 23 and the patterned domain control films 22 as shown in FIG. 14a.

Figure 14B:
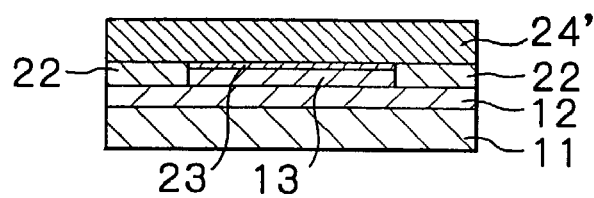

Then, as shown in FIG. 14b, a conductor layer 24' of Au is deposited on the etching stop film 23 and the domain control films 22.

Figure 14C:
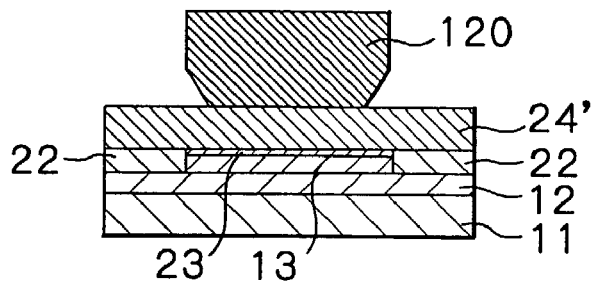

Then, as shown in FIG. 14c, a resist pattern 120 is formed on the conductor layer 24' by photolithography.

Figure 14D:
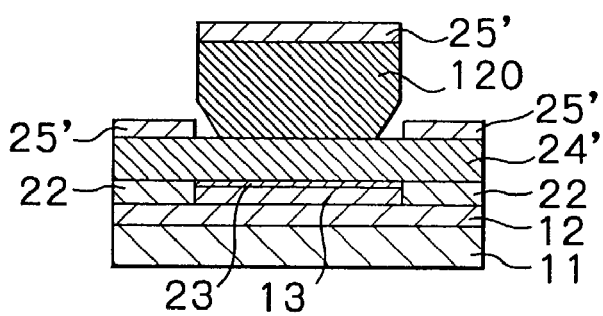

Then, as shown in FIG. 14d, a cap layer 25' of Ta is deposited on the resist pattern 120 and the conductor layer 24'.

Figure 14E:
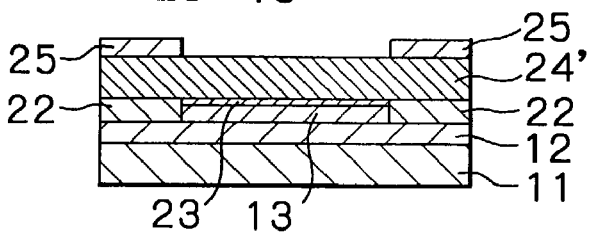

Thereafter, the resist pattern 120 and Ta deposited thereon are removed by executing the lift-off process to obtain a patterned cap layer 25. FIG. 14e shows a layer structure after the lift-off process.

Figure 14F:
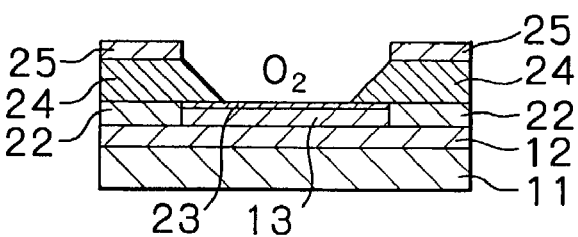

Then, the conductor layer 24' of Au is dry-etched through a mask of the cap layer 25 of Ta using O$_2$ gas to obtain the patterned first lead conductors 24. Conditions of this dry-etching process are the same as shown in Table 12 for example. FIG. 14f shows a layer structure after the dry-etching process.

Figure 14G:
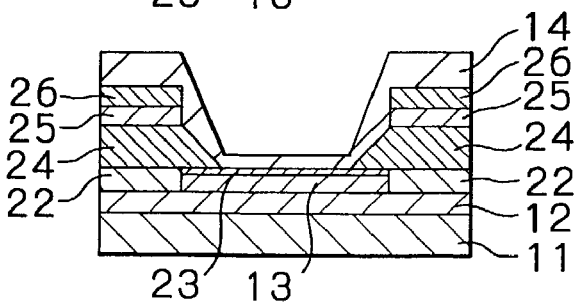

Thereafter, as shown in FIG. 14g, second lead conductors 26 are formed on the cap layer 25, and an upper shield gap layer 14 of Al$_2$O$_3$ or SiO$_2$ for example is deposited thereon.

Since the conductor layer 24' is dry-etched using the O$_2$ gas in this embodiment, this conductor layer 24' of Au can be precisely etched with a reliability even when the mask of the cap layer 25 made of Ta is thinned. This is because a selective ratio of Au with respect to Ta is a very high value such as 20.4.

The cap layers 25 and the etching stop film 23 are made of Ta in this embodiment. However, the cap layer and/or the etching stop film may be made of Ta alloy, Ti, Ti alloy, or nitride of Ta, Ta alloy, Ti or Ti alloy other than Ta.

The first lead conductors 24 are made of Au in this embodiment. However, the first lead conductors may be made of Au alloy such as AuCu, AuNi, AuSi and AuTi other than Au.

Other configurations, operations, advantages and modifications in this embodiment are substantially the same as those in the embodiment of FIG. 1.

FIGS. 15a to 15g illustrate a part of a manufacturing process of an MR sensor in a further embodiment according to the present invention.

Figure 15A:
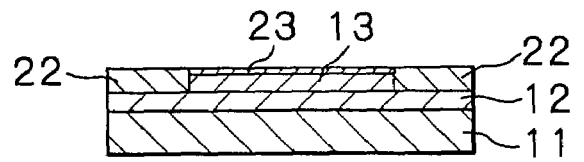
FIGS. 15a to 15g show sectional views seen from an ABS illustrating a part of a manufacturing process of an MR sensor in a further embodiment according to the present invention.

First, as well as the embodiment of FIG. 1, an under film (not shown) is deposited on a substrate 10 of AlTiC and an under shield layer 11 of NiFe for example is formed by plating for example on the under layer. A lower shield gap layer 12 of Al$_2$O$_3$ or SiO$_2$ for example is deposited thereon. Then, an MR film of a SVMR multi-layered film or an AMR single layer film is deposited on the lower shield gap layer 12 and an etching stop film of Ta is deposited thereon. Then, a lift-off pattern is formed by photolithography and the MR film and the etching stop film are etched by for example ion milling through the lift-off pattern. Then, a domain control film of CoPt for example is deposited without removing the lift-off pattern and thereafter the pattern is lifted-off to form the patterned MR film 13, the patterned etching stop film 23 and the patterned domain control films 22 as shown in FIG. 15a.

Figure 15B:
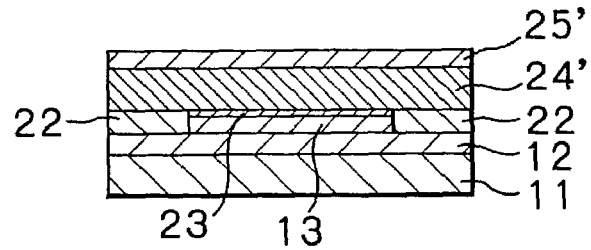

Then, as shown in FIG. 15b, a conductor layer 24' of Au is deposited on the etching stop film 23 and the domain control films 22 and a cap layer 25' of Ta is deposited thereon.

Figure 15C:
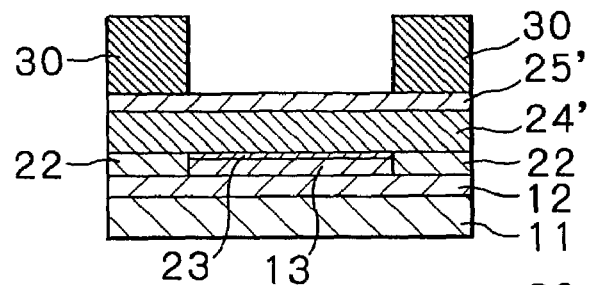

Then, as shown in FIG. 15c, a resist pattern 30 is formed on the cap layer 25' of Ta by photolithography.

Thereafter, the cap layer 25' is etched through a mask of the resist pattern 30 using CF$_4$ gas to obtain a patterned cap layer 25. Conditions of this etching process are the same as shown in Table 1 for example.

Figure 15D:
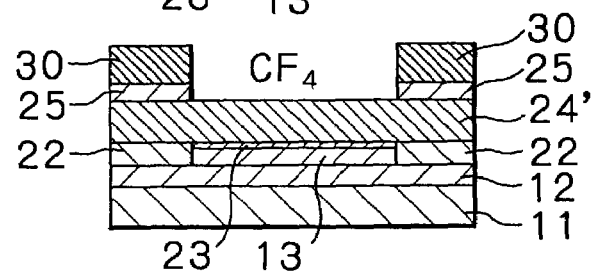

FIG. 15d shows a layer structure after the etching process. It is possible to prevent occurrence of a burr of the etched cap layer 25' by executing this etching process under the optimum conditions using CF$_4$ gas. In stead of the CF$_4$ gas, any gas with a relatively large selective ratio between the resist material and the cap layer material such as $C_2F_6$ gas or $SF_6$ gas for example may be used.

Then, by an ashing process using $O_2$ gas, the resist pattern 30 is removed. Conditions of this ashing process are the same as shown in Table 2 for example.

Figure 15E:
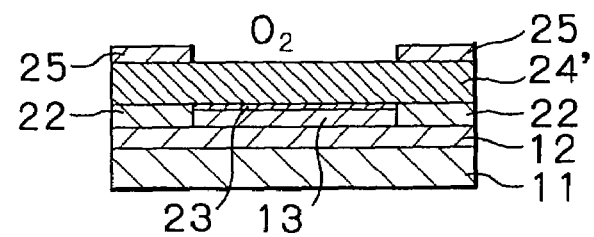

FIG. 15e shows a layer structure after the ashing process. It should be noted that the cap layer 25 located beneath the resist pattern 30 is hardly etched under these conditions.

The conductor layer 24' of Au is dry-etched through a mask of the cap layer 25 of Ta using $N_2$ gas to obtain the patterned first lead conductors 24. Table 13 shows an example of the conditions of this dry-etching process.

TABLE 13

| Used gas | Flow amount of gas (sccm) | Micro wave (W) | RF (W) | Pressure (mTorr) | Time (sec) | Etching rate of Au (nm/min) | Etching rate of Ta (nm/min) | Selective ratio of Au against Ta |
|---|---|---|---|---|---|---|---|---|
| $N_2$ | 200 | 1000 | 30 | 3 | 84 | 36.13 | 0.71 | 50.8 |

Figure 15F:
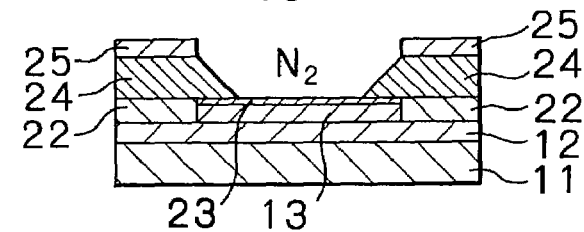

FIG. 15f shows a layer structure after the dry-etching process.

Figure 15G:
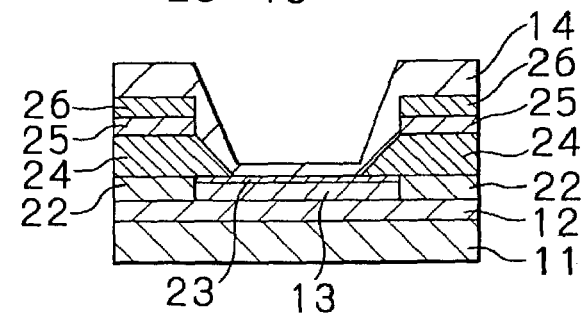

Thereafter, as shown in FIG. 15g, second lead conductors 26 are formed on the cap layer 25, and an upper shield gap layer 14 of $Al_2O_3$ or $SiO_2$ for example is deposited thereon.

Since the conductor layer 24' is dry-etched using the $N_2$ gas in this embodiment, this conductor layer 24' of Au can be precisely etched with a reliability even when the mask of the cap layer 25 made of Ta is thinned. This is because a selective ratio of Au with respect to Ta is an extremely high value such as 50.8.

The cap layers 25 and the etching stop film 23 are made of Ta in this embodiment. However, the cap layer and/or the etching stop film may be made of Ta alloy, Ti, Ti alloy, or nitride of Ta, Ta alloy, Ti or Ti alloy other than Ta.

The first lead conductors 24 are made of Au in this embodiment. However, the first lead conductors may be made of Au alloy such as AuCu, AuNi, AuSi and AuTi other than Au.

Other configurations, operations, advantages and modifications in this embodiment are substantially the same as those in the embodiment of FIG. 1.

FIGS. 16a to 16g illustrate a part of a manufacturing process of an MR sensor in a further embodiment according to the present invention.

Figure 16A:
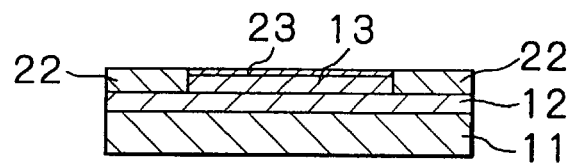
FIGS. 16a to 16g show sectional views seen from an ABS illustrating a part of a manufacturing process of an MR sensor in a further embodiment according to the present invention.

First, as well as the embodiment of FIG. 1, an under film (not shown) is deposited on a substrate 10 of AlTiC and an under shield layer 11 of NiFe for example is formed by plating for example on the under layer. A lower shield gap layer 12 of $Al_2O_3$ or $SiO_2$ for example is deposited thereon. Then, an MR film of a SVMR multi-layered film or an AMR single layer film is deposited on the lower shield gap layer 12 and an etching stop film of Ta is deposited thereon. Then, a lift-off pattern is formed by photolithography and the MR film and the etching stop film are etched by for example ion milling through the lift-off pattern. Then, a domain control film of CoPt for example is deposited without removing the lift-off pattern and thereafter the pattern is lifted-off to form the patterned MR film 13, the patterned etching stop film 23 and the patterned domain control films 22 as shown in FIG. 16a.

Figure 16B:
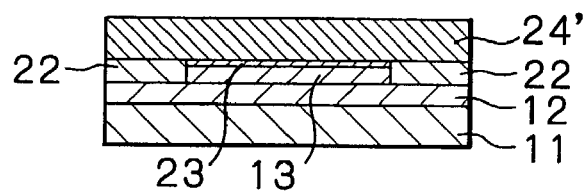

Then, as shown in FIG. 16b, a conductor layer 24' of Au is deposited on the etching stop film 23 and the domain control films 22.

Figure 16C:
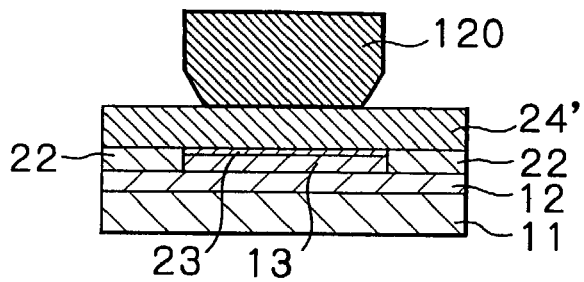

Then, as shown in FIG. 16c, a resist pattern 120 is formed on the conductor layer 24' by photolithography.

Figure 16D:
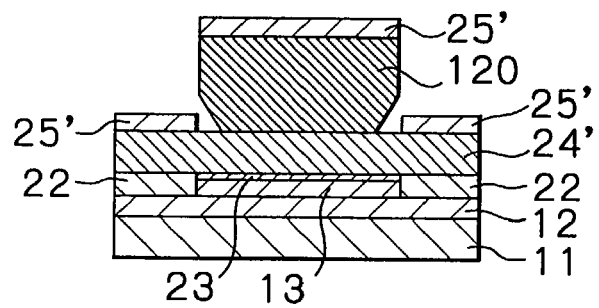

Then, as shown in FIG. 16d, a cap layer 25' of Ta is deposited on the resist pattern 120 and the conductor layer 24'.

Figure 16E:
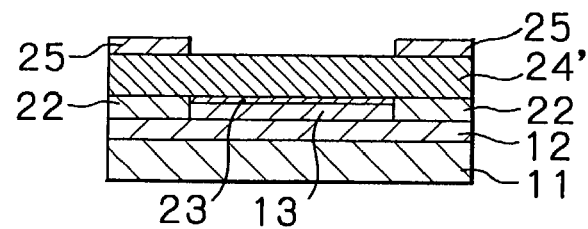

Thereafter, the resist pattern 120 and Ta deposited thereon are removed by executing the lift-off process to obtain a patterned cap layer 25. FIG. 16e shows a layer structure after the lift-off process.

Figure 16F:
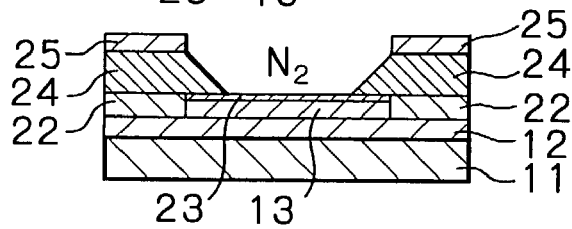

Then, the conductor layer 24' of Au is dry-etched through a mask of the cap layer 25 of Ta using a $N_2$ gas to obtain the patterned first lead conductors 24. Conditions of this dry-etching process are the same as shown in Table 13 for example. FIG. 16f shows a layer structure after the dry-etching process.

Figure 16G:
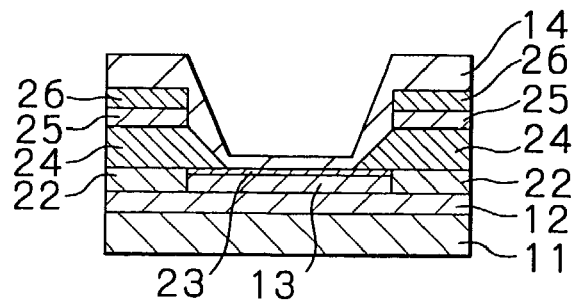

Thereafter, as shown in FIG. 16g, second lead conductors 26 are formed on the cap layer 25, and an upper shield gap layer 14 of $Al_2O_3$ or $SiO_2$ for example is deposited thereon.

Since the conductor layer 24' is dry-etched using the $N_2$ gas in this embodiment, this conductor layer 24' of Au can be precisely etched with a reliability even when the mask of the cap layer 25 made of Ta is thinned. This is because a selective ratio of Au with respect to Ta is an extremely high value such as 50.8.

The cap layers 25 and the etching stop film 23 are made of Ta in this embodiment. However, the cap layer and/or the etching stop film may be made of Ta alloy, Ti, Ti alloy, or nitride of Ta, Ta alloy, Ti or Ti alloy other than Ta.

The first lead conductors 24 are made of Au in this embodiment. However, the first lead conductors may be made of Au alloy such as AuCu, AuNi, AuSi and AuTi other than Au.

Other configurations, operations, advantages and modifications in this embodiment are substantially the same as those in the embodiment of FIG. 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A manufacturing method of a magnetoresistive effect thin-film magnetic head with a magnetoresistive effect film and lead conductors overlapping each other, comprising the steps of:

depositing an etching stop film on at least said magnetoresistive effect film;

depositing a conductor layer on the deposited etching stop film;

forming a cap layer patterned on the deposited conductor layer; and dry-etching the deposited conductor layer through a mask of the patterned cap layer using an argon-oxygen gas mixture so as to etch and pattern the deposited conductor film to form the lead conductors.

2. The manufacturing method as claimed in claim 1, wherein said cap layer is made of a tantalum, a tantalum alloy, a titanium, a titanium alloy, or a nitride of a tantalum, a tantalum alloy, a titanium or a titanium alloy.

3. The manufacturing method as claimed in claim 1, wherein said conductor layer is made of a gold or a gold alloy.

4. The manufacturing method as claimed in claim 1, wherein the forming step of the cap layer comprises forming a resist pattern on the deposited conductor layer, depositing a cap layer on the deposited conductor layer through the resist pattern, and lifting-off the resist pattern.

5. The manufacturing method as claimed in 1, wherein the etching stop film is made of a tantalum, a tantalum alloy, a titanium, a titanium alloy, or a nitride of a tantalum, a tantalum alloy, a titanium or a titanium alloy.

6. The manufacturing method as claimed in claim 1, wherein the dry-etching step comprises dry-etching using the argon-oxygen gas mixture with conditions of a bias power and a gas pressure to obtain a desired taper angle of end surfaces of the lead conductors.

7. The manufacturing method as claimed in claim 1, wherein the forming step of the cap layer comprises depositing a cap layer on the deposited conductor layer, forming a resist pattern on the deposited cap layer, and etching the deposited cap layer through a mask of the resist pattern using a fluorine based gas to pattern the cap layer.

8. The manufacturing method as claimed in claim 7, wherein the fluorine based gas is a carbon tetrafluoride gas, a hexafluoromethane gas or a sulfur hexafluoride gas.

9. The manufacturing method as claimed in claim 7, wherein said method further comprises a step of removing the resist pattern by ashing using an oxygen gas after the etching of the deposited cap layer.

10. A manufacturing method of a magnetoresistive effect thin-film magnetic head with a magnetoresistive effect film and lead conductors overlapping each other, comprising the steps of:

depositing a conductor layer on at least said magnetoresistive effect film;

forming a metallic cap layer patterned on the deposited conductor layer; and dry-etching the deposited conductor layer through a mask of the patterned cap layer using only an oxygen gas so as to etch and pattern the deposited conductor film to form the lead conductors.

11. The manufacturing method as claimed in claim 10, wherein said cap layer is made of a tantalum, a tantalum alloy, a titanium, a titanium alloy, or a nitride of a tantalum, a tantalum alloy, a titanium or a titanium alloy.

12. The manufacturing method as claimed in claim 10, wherein said conductor layer is made of a gold or a gold alloy.

13. The manufacturing method as claimed in claim 10, wherein the forming step of the cap layer comprises forming a resist pattern on the deposited conductor layer, depositing a cap layer on the deposited conductor layer through the resist pattern, and lifting-off the resist pattern.

14. The manufacturing method as claimed in claim 10, wherein the dry-etching step comprises dry-etching using an oxygen gas with conditions of a bias power and a gas pressure to obtain a desired taper angle of end surfaces of the lead conductors.

15. The manufacturing method as claimed in claim 10, wherein said method further comprises a step of depositing an etching stop film on at least said magnetoresistive effect film, and then depositing the conductor layer thereon.

16. The manufacturing method as claimed in claim 15, wherein the etching stop film is made of a tantalum, a tantalum alloy, a titanium, a titanium alloy, or a nitride of a tantalum, a tantalum alloy, a titanium or a titanium alloy.

17. The manufacturing method as claimed in claim 10, wherein the forming step of the cap layer comprises depositing a cap layer on the deposited conductor layer, forming a resist pattern on the deposited cap layer, and etching the deposited cap layer through a mask of the resist pattern using a fluorine based gas to pattern the cap layer.

18. The manufacturing method as claimed in claim 17, wherein the fluorine based gas is a carbon tetrafluoride gas, a hexafluoromethane gas or a sulfur hexafluoride gas.

19. The manufacturing method as claimed in claim 17, wherein said method further comprises a step of removing the resist pattern by ashing using an oxygen gas after the etching of the deposited cap layer.

20. A manufacturing method of a magnetoresistive effect thin-film magnetic head with a magnetoresistive effect film and lead conductors overlapping each other, comprising the steps of:

depositing a conductor layer on at least said magnetoresistive effect film;

forming a cap layer patterned on the deposited conductor layer; and dry-etching the deposited conductor layer through a mask of the patterned cap layer using only a nitrogen gas so as to etch and pattern the deposited conductor film to form the lead conductors.

21. The manufacturing method as claimed in claim 20, wherein said cap layer is made of a tantalum, a tantalum alloy, a titanium, a titanium alloy, or a nitride of a tantalum, a tantalum alloy, a titanium or a titanium alloy.

22. The manufacturing method as claimed in claim 20, wherein said conductor layer is made of a gold or a gold alloy.

23. The manufacturing method as claimed in claim 20, wherein the forming step of the cap layer comprises forming a resist pattern on the deposited conductor layer, depositing a cap layer on the deposited conductor layer through the resist pattern, and lifting-off the resist pattern.

24. The manufacturing method as claimed in claim 20, wherein the dry-etching step comprises dry-etching using a nitrogen gas with conditions of a bias power and a gas pressure to obtain a desired taper angle of end surfaces of the lead conductors.

25. The manufacturing method as claimed in claim 20, wherein said method further comprises a step of depositing an etching stop film on at least said magnetoresistive effect film, and then depositing the conductor layer thereon.

26. The manufacturing method as claimed in claim 25, wherein the etching stop film is made of a tantalum, a tantalum alloy, a titanium, a titanium alloy, or a nitride of a tantalum, a tantalum alloy, a titanium or a titanium alloy.

27. The manufacturing method as claimed in claim 20, wherein the forming step of the cap layer comprises depositing a cap layer on the deposited conductor layer, forming a resist pattern on the deposited cap layer, and etching the deposited cap layer through a mask of the resist pattern using a fluorine based gas to pattern the cap layer.

28. The manufacturing method as claimed in claim 27, wherein the fluorine based gas is a carbon tetrafluoride gas, a hexafluoromethane gas or a sulfur hexafluoride gas.

29. The manufacturing method as claimed in claim 27, wherein said method further comprises a step of removing the resist pattern by ashing using an oxygen gas after the etching of the deposited cap layer.

* * * * *